United States Patent [19]

Katayama et al.

[11] Patent Number: 5,565,916
[45] Date of Patent: Oct. 15, 1996

[54] AUTOMATIC CHANNEL GAIN AND OFFSET BALANCE FOR VIDEO CAMERAS EMPLOYING MULTI-CHANNEL SENSORS

[75] Inventors: Andrew S. Katayama, Cardiff by the Sea; Harvey M. Horowitz, Laguna Hills, both of Calif.

[73] Assignee: Eastman Kodak Company, Rochester, N.Y.

[21] Appl. No.: 573,614

[22] Filed: Dec. 15, 1995

Related U.S. Application Data

[63] Continuation of Ser. No. 995,734, Dec. 23, 1992, abandoned.

[51] Int. Cl.⁶ .............. H04N 5/335; H04N 9/64; H04N 5/14; H03M 1/78
[52] U.S. Cl. .............. 348/321; 348/243; 348/251; 348/311; 348/572; 348/673; 341/139; 341/154; 341/156
[58] Field of Search .............. 370/16.1, 85.7, 370/85.12, 85.15; H04N 5/335, 9/64, 5/14

[56] References Cited

U.S. PATENT DOCUMENTS

| | | | |
|---|---|---|---|
| 3,683,367 | 8/1972 | Monroe et al. | 340/347 |
| 3,800,078 | 3/1974 | Cochran et al. | 178/7.1 |
| 3,824,588 | 7/1974 | Vermillion | 340/347 |
| 4,064,484 | 12/1977 | Mese et al. | 340/146.3 |
| 4,128,830 | 12/1978 | Weythman | 340/146.3 |
| 4,216,503 | 8/1980 | Wiggins | 348/446 |
| 4,322,752 | 5/1982 | Bixby | 358/213 |
| 4,525,741 | 6/1985 | Chahal et al. | 358/212 |
| 4,593,268 | 6/1986 | Blauschild | 340/347 |
| 4,625,240 | 11/1986 | Yablonski et al. | 358/143 |
| 4,628,362 | 12/1986 | Waehner | 358/174 |
| 4,642,693 | 2/1987 | Fuse et al. | 358/236 |
| 4,642,694 | 2/1987 | Yamagishi et al. | 358/236 |
| 4,771,267 | 9/1988 | Russell, Jr. et al. | 341/118 |
| 4,860,103 | 8/1989 | Azam et al. | 558/160 |
| 4,998,209 | 5/1991 | Vuichard et al. | 382/8 |
| 5,043,731 | 8/1991 | Nishimura | 341/154 |
| 5,047,861 | 9/1991 | Houchin et al. | 358/213.15 |
| 5,053,771 | 10/1991 | McDermott | 341/156 |
| 5,083,204 | 1/1992 | Heard et al. | 348/164 |
| 5,196,938 | 3/1993 | Blessinger | 348/22 |

OTHER PUBLICATIONS

Prokop et al.—Millisecond Readout CCD Camera—Sep. 25, 1992, EGG–10617–5100—International Congress on High Speed Photography and Phontonics (20th).

Kerth et al., A 12-Bit 1-MHz Two Step Flash ADC—IEEE Journal of Solid-State Circuits, vol. 24, No. 2, Apr. 1989.

*Primary Examiner*—Wendy Garber
*Assistant Examiner*—Andrew B. Christensen
*Attorney, Agent, or Firm*—William F. Noval

[57] ABSTRACT

A high frame rate camera includes;

a multi-channel sensor array for producing a plurality of parallel analog image signals representative of a sensed image;

a plurality of analog-to-digital converters (ADC) for converting each of the parallel analog image signals to parallel digital image signals, wherein each of the ADCs has a fine gain parameter which is a function of a top ladder potential and also has a fine offset parameter which is a function of a bottom ladder potential; and a control for controlling the fine gain and offset parameters of each of the ADCs by means of fine gain and offset control signals which are a function of desired average output black and gray levels of the image signal.

6 Claims, 3 Drawing Sheets

AUTOMATIC CHANNEL GAIN AND OFFSET BALANCE FOR VIDEO CAMERAS EMPLOYING MULTI-CHANNEL SENSORS

This is a continuation of application Ser. No. 07/995,734, filed 23 Dec. 1992, now abandoned.

FIELD OF THE INVENTION

This invention relates in general to high frame rate video cameras and relates more particularly to automatic channel gain and offset balance for high frame rate video cameras employing multi-channel sensors.

BACKGROUND OF THE INVENTION

High frame rate video cameras employ a multi-channel sensor array to minimize channel bandwidth and data rate. (See, for example, U.S. Pat. No. 4,322,752, issued Mar. 30, 1982, inventor Bixby). One of the difficulties to be dealt with in using such a sensor is the requirement for the transfer characteristic, relating output signal amplitude to sensor illumination, to be closely matched across all channels. Under uniform sensor illumination, matching errors larger than approximately 1% can be readily detected by the human eye. If the transfer function is linear, uniformity can be achieved by adjusting individual channel gain and offset. This method is used in known multi-channel imager based on a 16 channel sensor. As the number of channels increase, however, this approach becomes tedious and highly prone to human error.

There is thus a problem, in high frame rate video cameras employing a multichannel area sensor array, of maintaining image uniformity across the image, without banding, that the following patents do not address.

| U.S. Pat. No. | Issued | Inventor(s) |
|---|---|---|
| 4,525,741 | 6/25/85 | Chahaf |
| 4,578,711 | 3/26/86 | White et al. |
| 4,642,694 | 2/10/87 | Yamagashi et al. |
| 4,860,103 | 8/22/89 | Azam et al. |
| 5,053,771 | 10/1/91 | McDemott |
| 4,771,267 | 9/13/88 | Russell |
| 4,216,503 | 8/5/80 | Wiggins |
| 4,628,362 | 12/9/86 | Waehner |
| 4,625,240 | 11/25/86 | Yablonski |
| 3,800,078 | 3/26/74 | Cochran |
| 4,064,484 | 12/20/77 | Mese et al. |
| 4,128,830 | 12/5/78 | Weythman |
| 5,043,731 | 8/27/91 | Nishimura |
| 3,683,367 | 8/8/72 | Monroe et al. |
| 4,642,693 | 2/10/87 | Fuse et al. |
| 5,047,861 | 9/10/91 | Houchin |
| 3,824,588 | 7/16/74 | Vermillion |
| 4,593,268 | 6/3/86 | Blauschild |

SUMMARY OF THE INVENTION

According to the present invention there is provided a high frame rate camera employing a multi-channel sensor array which solves the problem in the prior art of banding and of providing image uniformity across a plurality of channels of image information. According to an aspect of the invention, a high frame rate camera comprises;

a multi-channel sensor array means for producing a plurality of parallel analog image signals representative of a sensed image;

a plurality of analog-to-digital converter (ADC) means for converting each of said parallel analog image signals to parallel digital image signals, wherein each of said ADC means has a fine gain parameter which is a function of a top ladder potential and also has a fine offset parameter which is a function of a bottom ladder potential; and control means for controlling the fine gain and offset parameters of each of said ADC means by means of fine gain and offset control signals which are a function of desired average output black and gray levels of said image signal.

DETAILED DESCRIPTION OF THE PREFERRED EMBODIMENT

A. System Block Diagram

Figure 1:
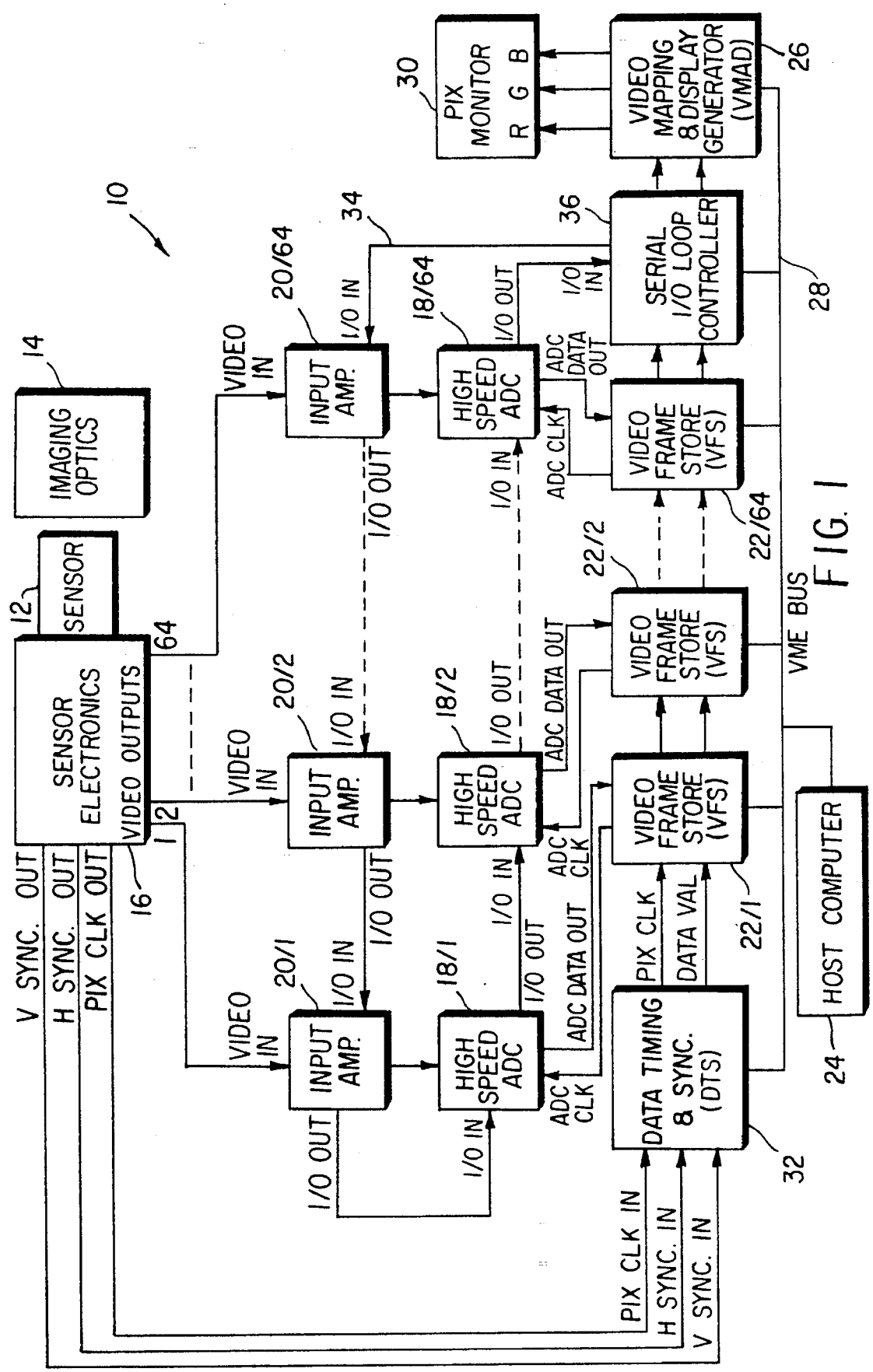
FIG. 1 is a block diagram of a multichannel high frame rate camera incorporating an embodiment of the present invention.

A block diagram of a multichannel high frame rate camera is shown in FIG. 1. As shown, camera 10 has a sensor 12 which provides, for example, up to 64 video output channels. It will be understood by those skilled in the art that sensor 12 can provide any number of output channels other than 64. Sensor 12 senses a scene by means of imaging optics 14. Sensor 12 is controlled by sensor electronics 16. Sensor 12 and sensor electronics 16 are described in greater detail in the above-referenced Bixby U.S. Pat. No. 4,322,752, which is incorporated herein by reference. In general, however, sensor 12 has an array of photosites arranged in rows and columns which are read out in blocks of photosites, with each block including a plurality of adjacent photosite rows. A block of photosites is enabled by the application of an enablement signal from circuit 16 to the photosites within the block; and a column address signal from circuit 16 is sequentially applied to the photosite columns to effect column-wise readout of the photosite rows within the enabled block. The output signal from sensor 12 includes blocks of information in serial format, while the information content of each block includes a plurality of line signals in a parallel format, such line signals corresponding to the individual photosite rows within that block.

It will be understood that the blocks of photosites need not be comprised of adjacent photosite rows, but rather, can be comprised of any plurality of photosite rows. It will also be understood that a sensor containing an array of photosites can be read in subsets of photosites other than blocks comprised of a plurality of photosite rows.

Each channel signal is digitized by a high speed Analog-to-Digital Converter (ADC), such as ADCs 18/1, 18/2, . . . , 18/64, after amplification in video amplifiers 20/1, 20/2, . . . , 20/64. A large number of video frames can be captured by a high speed, solid state, Video Frame Store (VFS), e.g. VFSs 22/1, 22/2, . . . , 22/64., for subsequent playback and/or analysis. Video data can be accessed by either the host computer 24, or the dedicated Video Mapping and Display System (VMAD) 26, via the system's VME bus 28. Video images are displayed on monitor 30.

Sensor electronics circuit 16 provides V sync, H sync and Pixel clock signals to Data Timing & Sync circuit (DTS) 32 for controlling VFSs 22/1–22/64.

Individual channel gain and offset (coarse and fine) is modified by control data from the host computer 24 via a serial, input-output (I/O) loop 34 which is controlled by controller 36. Fine gain and offset are controlled in the ADCs 18/1–18/64. Coarse gain and offset are controlled in the video amplifiers 20/1–20/64.

During a calibration procedure, the offset of each channel is adjusted in the absence of illumination of sensor 12 in order to achieve a desired average output black level. Similarly, the gain for each channel is adjusted under a condition of uniform illumination of sensor 12 to achieve a desired average output gray level. During the calibration procedure, host computer 24 determines the offset and gain values to be applied in each channel by the above procedures. The average channel output level is estimated and the channel gain and/or offset are modified to achieve a target value for average channel output. Individual channel gain and offset settings are saved, for example, on a hard disk drive in host computer 24 for subsequent use between calibration.

B. Fine Gain and Offset Control

Fine adjustments in channel gain and offset are achieved by modifying the analog reference voltages applied to the top and bottom of the resistive ladder networks employed by the High Speed ADC 18. ADC 18 is preferably a flash (parallel) ADC in which an input signal is fed simultaneously to one input of each of n comparators, the other inputs of which are connected to n equally spaced reference voltages present on the resistive ladder network. The flash ADC includes a priority encoder which generates a digital output corresponding to the highest comparator activated by the input voltage. Conversion gain is proportional to the potential difference between the top and the bottom potentials of the ladder network. Conversion offset is proportional to the bottom ladder potential.

Figure 2:
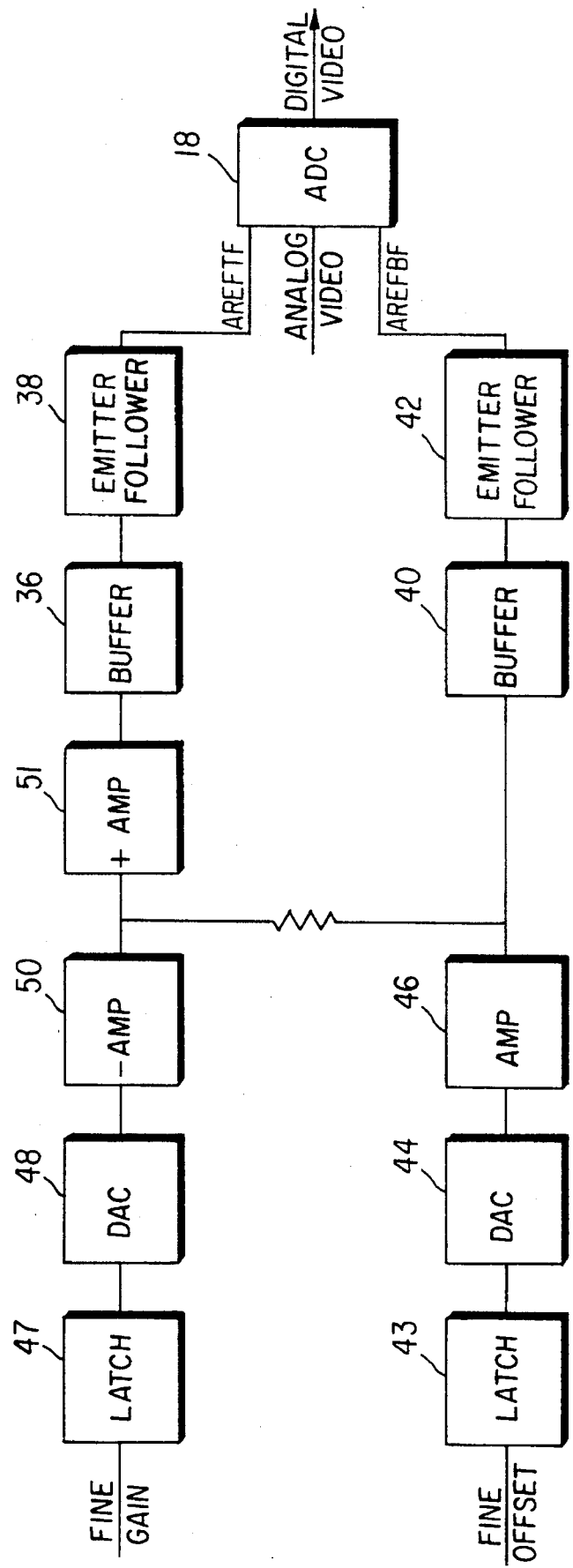
FIG. 2 is a schematic diagram of a circuit for effecting fine gain and offset control in the camera of FIG. 1.

As shown in the schematic diagram of ADC 18 in FIG. 2, top ladder potential, AREFTF, and bottom ladder potential, AREFBF, are set by the input to control amplifiers 36, 38, and 40, 42. Input to the bottom ladder control amplifier 40, 42 is an analog offset control signal proportional to the digital input to an offset control digital-to-analog converter (DAC) 44, 46 from latch 43. Input to the top ladder control amplifier 36, 38 is proportional to the sum of the offset control signal and a gain control signal applied to amplifier 51. The gain control signal is proportional to the digital input from latch 47 to a gain control DAC 48, 50. Bottom ladder potential varies, for example, from −0.6 volts to −1.4 volts in response to the 8 bit binary input to the offset control DAC 44, 46. Differential top to bottom ladder potential varies, for example, from 1.6 to 2.4 volts in response to the 8 bit binary input to the gain control DAC 48, 50. Offset control range is plus or minus 20% of the nominal full scale ADC input, and gain control range is from 83% to 125% of nominal.

C. Coarse Gain and offset Control

Figure 3:
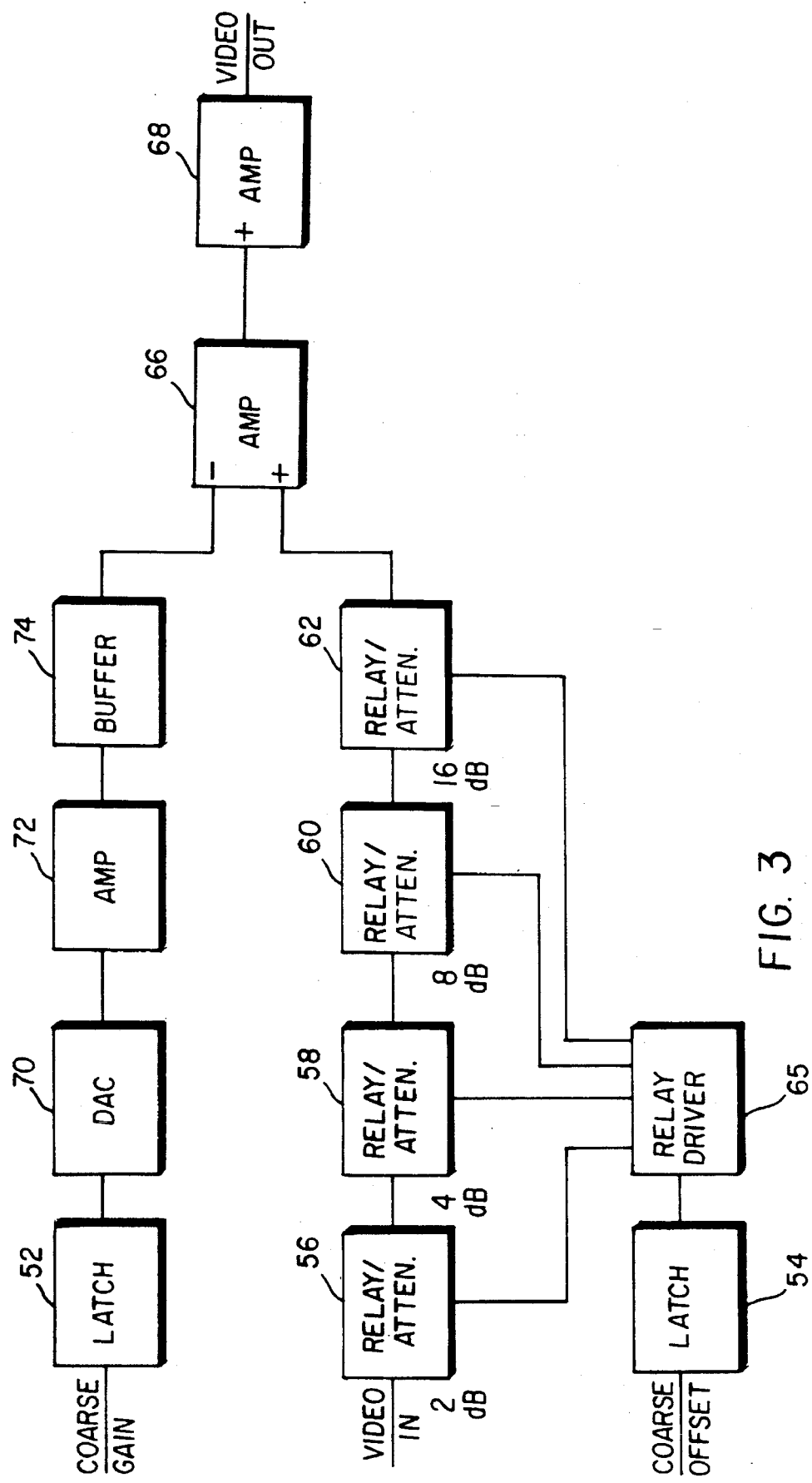
FIG. 3 is a schematic diagram of a circuit for effecting coarse gain and offset control of the camera of FIG. 1.

In FIG. 3, there is shown in greater detail Video Input Amplifier 20. Video input amplifier 20 receives coarse gain and offset control data from the host computer 24 via an Serial-I/O Loop Controller 36. In the circuit shown, four bits of coarse gain control data and 8 bits of coarse offset control data are latched in respective latches 52, 54. The four coarse gain control bits operate the relays 56–62 of a wideband step attenuator 64 via Relay Driver 65. Input signal attenuation ranges from 0 dB to 30 dB in 2 dB steps. The step attenuator 64 is cascaded with the noninverting input of a fixed gain wideband Video Amplifier 66, 68. The combination of the variable attenuator 64 and fixed gain amplifier 66, 68 provides, for example, coarse gain control ranging from −6 dB to +24 dB in 2 dB steps, if, for example, amplifier 66, 68 has a fixed gain of 24 dB. The 8 bit coarse offset control data is applied to a DAC 70, 72 to provide a coarse offset control signal ranging, for example, from −2 volts to +2 volts. The coarse offset control signal is applied to the inverting input of the wideband video amplifier 66, 68 via wideband, unity gain, buffer, 74. Since the gain at the amplifier's inverting input is one-half that at the non-inverting input, the effective coarse offset control range is from −1 volt to +1 volt in 256 steps.

The invention finds industrial application in motion analysis systems having a high frame rate camera employing a multi-channel sensor array.

The invention has been described in detail with particular reference to preferred embodiments thereof but it will be understood that variations and modifications can be effected within the spirit and scope of the invention.

What is claimed is:

1. Imaging apparatus comprising:
    a multi-channel area sensor which produces 1-n parallel analog image signals representative of a sensed image, where n is a whole number;
    1-n parallel image processing channels for respectively processing said 1-n parallel analog image signals; each of said image processing channels including (a) an analog-to-digital converter (ADC) for converting said analog image signal to a digital image signal, wherein each said ADC has a fine gain parameter which is a function of a top ladder potential and also has a fine offset parameter which is a function of a bottom ladder potential; and (b) a video amplifier coupled between said area sensor and said ADC, wherein each said video amplifier has coarse gain and coarse offset parameters;
    a serial input-output loop serially connecting each of said 1-n ADCs and each of said 1-n video amplifiers; and
    a control for sending digital fine gain, fine offset control signals over said serial input-output loop to control the fine gain and fine offset of each of said 1-n ADCs and digital coarse gain and coarse offset signals over said serial input-output loop to control the coarse gain and coarse output of each of said 1-n video amplifiers in order to produce a combined digital image signal having a uniform tonal range over the entire image when reproduced in a visual form.

2. The imaging apparatus of claim 1 wherein each said video amplifiers includes a fixed gain wide band video amplifier having inverting and noninverting inputs, and further includes a variable signal attenuator connected to said noninverting input, and wherein said coarse offset control signal from said control means is applied to said inverting input of said fixed gain wide band video amplifier and said coarse gain control signal is applied to said attenuator to vary the attenuation of said image signal applied to said attenuator.

3. The imaging apparatus of claim 2 wherein each said ADC has a fine gain parameter which is a function of a top ladder potential applied to said ADC and has a fine offset parameter which is a function of a bottom ladder potential applied to said ADC, and wherein said fine gain control signal from said control means is applied to said top ladder potential and said fine offset control signal from said control means is applied to said bottom ladder potential of said ADC.

4. The imaging apparatus of claim 3 wherein each said ADC is a flash ADC.

5. The imaging apparatus of claim 2 wherein said variable signal attenuator includes a plurality of cascaded step attenuators actuated by a relay driver assembly controlled by said coarse gain control signal.

6. The apparatus of claim 1 wherein said offset control signal for each said ADC means is determined during a calibration procedure in the absence of illumination of said sensor array means to achieve a desired average output black level in said combined digital image signal, and wherein said gain control signal for each said ADC means is effected during said calibration procedure under a condition of uniform illumination of said sensor array means to achieve a desired average output gray level in said combined digital image signal.

* * * * *